April 1, 1969 W. E. CALHOUN 3,435,700
FLUID CUSHIONED STEERING COLUMN
Filed Oct. 5, 1967 Sheet 1 of 3
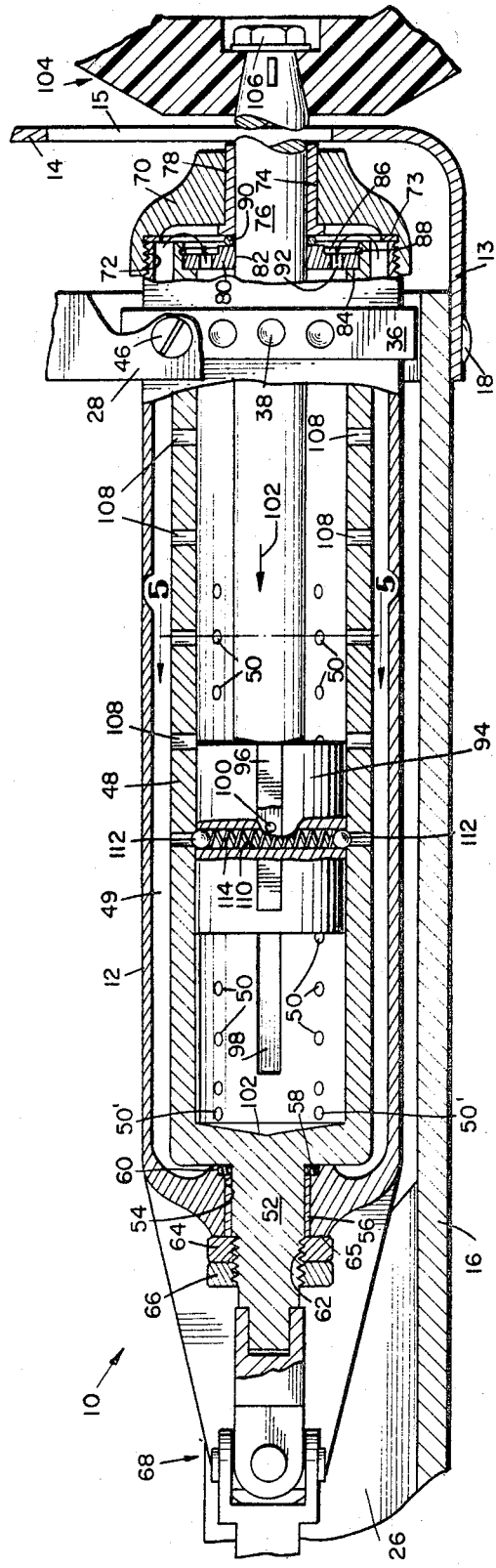
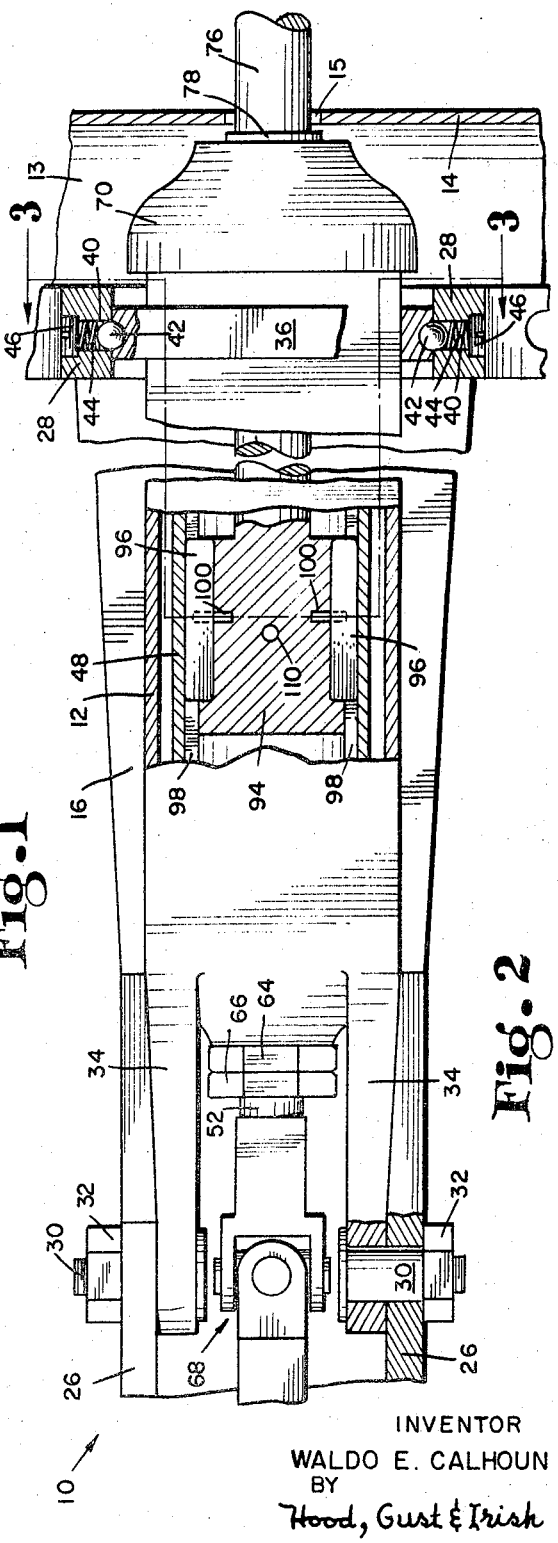
INVENTOR
WALDO E. CALHOUN
BY
Hood, Gust & Irish
ATTORNEYS

United States Patent Office 3,435,700
Patented Apr. 1, 1969

3,435,700
FLUID CUSHIONED STEERING COLUMN
Waldo E. Calhoun, R.D. 1, Bluffton, Ind. 46714
Filed Oct. 5, 1967, Ser. No. 673,056
Int. Cl. B62d 1/18
U.S. Cl. 74—493      12 Claims

ABSTRACT OF THE DISCLOSURE

A fluid cushioned vehicle steering apparatus comprising a reservoir, a cylinder having longitudinally spaced apertures formed therein and journalled for rotation in the reservoir, a piston and its connecting piston rod arranged for reciprocation in the cylinder, means for preventing rotation of the piston and piston rod relative to the cylinder, the piston rod extending through one end of the cylinder and reservoir to constitute a portion of the steering column for the vehicle, and means connected to the opposite end of the cylinder to constitute another portion of the steering column for the vehicle. The reciprocation of the piston in the cylinder is retarded by fluid contained therein, the fluid being forced through the apertures in the cylinder wall when the piston moves. Preferably, means are provided for mounting the reservoir at selectively adjustable heights and additional means are provided for selectively and adjustably the positioning the piston in the cylinder.

BACKGROUND OF THE INVENTION

*Field of the invention*

The present invention relates to steering columns and more particularly to the provision of a fluid cushioned steering column which comprises means for positioning the steering wheel of a vehicle inwardly and outwardly relative to the dashboard of the vehicle and additional means for selectively and adjustably positioned the steering wheel vertically relative to the dashboard. The steering apparatus of the present invention is arranged so that, upon impact, the steering wheel will move inwardly from any of its selected positions and such movement of the steering wheel is retarded in such a manner as to reduce or eliminate shock and injury to the driver of the vehicle in which the apparatus is installed.

DESCRIPTION OF THE PRIOR ART

Collapsible steering wheels are well known. See, for instance, the Roark Patent 2,028,953 issued Jan. 28, 1936. Likewise, collapsible and adjustable steering columns are known. See, for instance, the Tamboli Patent 2,549,345 issued Apr. 17, 1951, and the Helms Patent 2,910,887 issued Nov. 3, 1959.

Further, in view of the recent legislative requirements for safer automobiles, automobile manufacturers are busy designing and building collapsible steering columns.

SUMMARY OF THE INVENTION

The present invention comprises a reservoir, means for mounting the reservoir in an automotive vehicle, a cylinder having longitudinally spaced apertures formed therein and journalled for rotation in the reservoir, a piston and its connecting piston rod arranged for reciprocation in the cylinder, means for preventing rotation of the piston and piston rod relative to the cylinder, the piston rod extending through one end of the cylinder and the reservoir to constitute a portion of the steering column for the vehicle, and means connected to the opposite end of the cylinder to constitute another portion of the steering column of the vehicle. The piston and cylinder are arranged so that, when the piston is reciprocated in the cylinder, the fluid in the cylinder on one side of the piston is forced out through the apertures in the wall of the cylinder into the reservoir and back into the cylinder on the other side of the piston, such movement of fluid thereby retarding the movement of the piston.

Preferably, the reservoir is supported under the dashboard of the vehicle and the means for mounting the reservoir comprises bracket means including, near the front of the dashboard, first support means and, behind the front of the dashboard and toward the firewall of the vehicle, second support means, means for connecting the forward end of the reservoir to the second support means for piovtal movement about a generally horizontal axis, and selectively vertically adjustable means for connecting the rear end of the reservoir to the first support means.

In addition, means are provided for selectively and adjustably positioning the piston in the cylinder, such positioning means comprising detent means arranged releasably to hold the piston in any one of a plurality of stop positions arranged longitudinally along the cylinder.

Thus, it will be apparent that the rear end of the reservoir, i.e., the end through which the piston rod extends, is vertically adjustable and that the piston rod, which preferably has the steering wheel mounted thereon, is longitudinally adjustable.

The perforated cylinder and the piston provide a cushioning effect when the driver is thrown against the steering wheel. Specifically, the movement of the piston forces fluid contained in the cylinder through the apertures in the wall thereof into the reservoir which contains the cylinder. As the piston moves, it progressively closes the apertures in the wall of the cylinder until, near the end of its travel, all of the apertures are closed and further movement of the piston is resisted by the fluid being compressed. Of course, if the fluid contained in the cylinder and reservoir is a conventional hydraulic fluid, the piston will stop as soon as the last aperture in the direction of its travel is closed because such fluid is generally incompressible.

In addition to the cushioning effect provided by the movement of the piston in the cylinder, the selectively vertically adjustable means for connecting the rear end of the reservoir to the above-mentioned first support means is arranged to "break away" upon impact to permit the steering wheel to conform to the driver's body, thereby to prevent injury to the driver by contact with the top or botom of the steering wheel.

Further, by controlling the viscosity of the hydraulic fluid and the size and number of apertures, the force with which the movement of the piston is retarded can be established.

It is an object of the present invention, therefore, to provide a fluid-cushioned steering column which is also arranged so that the steering wheel connected to the steering column can be selectively and adjustably positioned inwardly and outwardly and vertically relative to the dashboard of the vehicle.

Another object of the present invention is to provide such a steering apparatus comprising a reservoir for containing the fluid utilized to cushion the movement of the rear end, i.e., the steering wheel end, of the steering column, the forward end of this reservoir being pivotally connected to the vehicle for movement about a horizontal axis, and means for releasably connecting the rear end of the reservoir in any one of a plurality of selected vertical positions.

The above-mentioned and other features and objects of this invention and the manner of attaining them will become more apparent and the invention itself will be best understood by reference to the following description of an embodiment of the invention taken in conjunction with the accompanying drawings wherein:

BRIEF DESCRIPTION OF THE DRAWINGS

FIG. 1 is a fragmentary, sectional side view of the apparatus of the present invention;

FIG. 2 is a fragmentary, sectional view of the apparatus taken generally from the top of FIG. 1;

DESCRIPTION OF THE PREFERRED EMBODIMENT

Figure 3:
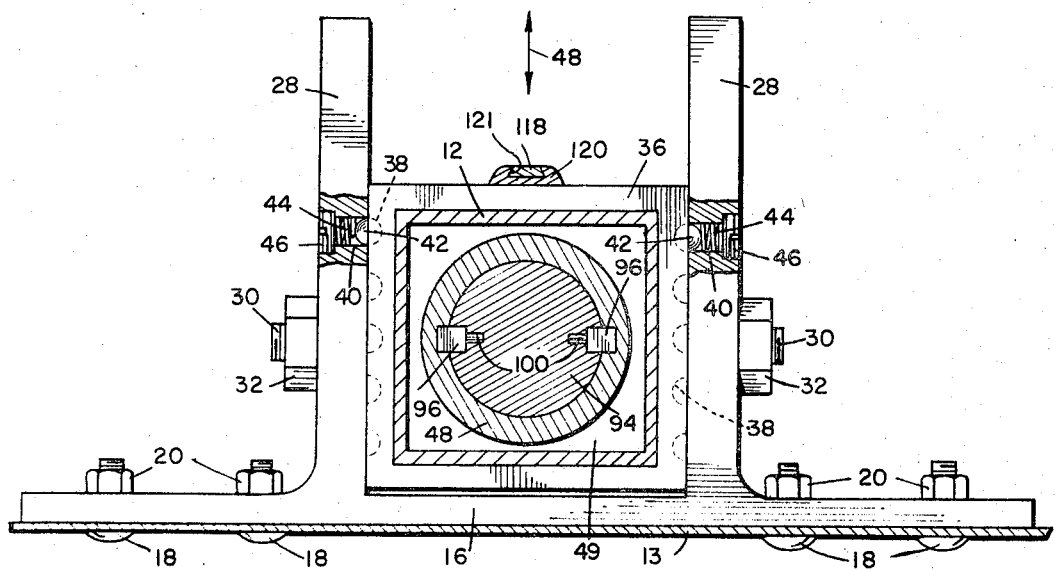
FIG. 3 is a fragmentary, sectional view taken from FIG. 2 generally along the line 3—3 and showing the bracket means supporting the rear end of the fluid reservoir.

The steering apparatus of the present invention, indicated generally by the reference numeral 10 in FIGS. 1 and 2, comprises a reservoir 12 which may take a plurality of shapes, but which is preferably of the illustrated elongated shape. This reservoir 12 is preferably supported in a vehicle under the dashboard thereof (a portion of a dashboard instrument panel 14 being shown in FIGS. 1, 2, 3 and 4) by means of a bracket 16 secured at its rear end to the bottom flange 13 of the instrument panel 14 by means such as the illustrated screws 18 and nuts 20 and at its forward end to a mounting collar 22 (FIGS. 6 and 7) by means such as the illustrated screws 24. It will be apparent that, in a conventional automobile, the mounting collar 22 is mounted on the rear end of the forward portion of the steering column, i.e., the sleeve 19 which peripherally encloses the lower steering shaft 23 and which extends rearwardly of the firewall 19' toward the dashboard of the automobile.

The illustrative bracket 16 is formed to provide, at its forward end, a pair of laterally spaced, generally vertically extending flanges 26, and, at its rear end, a pair of laterally spaced, generally vertically extending fingers 28. The fingers 28 are clearly shown in FIG. 3.

The reservoir 12 is received between the flanges 26 and fingers 28 as shown clearly in FIGS. 1, 2 and 3. Specifically, the forward end of the reservoir 12 is journalled between the flanges 26 by means such as the pivot bolts 30 for pivotal movement about a generally horizontal axis, the illustrated nuts 32 being provided to secure the bolts 30.

Referring specifically to FIG. 2, it will be seen that the illustrative reservoir 12 is provided with a pair of forwardly extending mounting flanges 34 received between the flanges 26 and through which the pivot bolts 30 extend.

Mounted at the rear end of the reservoir 12, as seen clearly in FIG. 3, is a square mounting block 36 which is snugly but slidably received between the fingers 28. Each side of the block 36 which engages the inside surface of a finger 28 is preferably provided with a plurality of generally vertically spaced, generally concave cutouts 38. Preferably, these cutouts 38 are arranged about the circumference of a circle having its radius coinciding with the axes of the pivot bolts 30, as seen in FIG. 1.

Each finger 28 is provided with a cylindrical opening 40 in which a ball 42 is rollably carried, each of the openings 40 being registrable with the cutouts 38 on the side of the block 36 facing the opening. Each ball 42 is urged inwardly toward the block 36 by a spring 44 which is received in the opening 40 and which is held in engagement with the ball 42 by a set screw 46.

The tension on the springs 44 is adjusted so that the block 36 can be moved vertically in the direction of the arrow 48 (FIG. 3) with the cutouts 38 defining a plurality of stop positions in which the block 36 can be releasably engaged. Thus, the arrangement of the cutouts 38, balls 42 and springs 44 comprises a detent means for selectively and adjustably positioning the rear end of the reservoir 12, the holding power of the detent means being easily overcome by the operator of the vehicle provided with the apparatus 10.

A cylinder 48 having longitudinally spaced apertures 50 formed in the side wall thereof is journalled for rotation about its axis in the reservoir 12. Cylinder 48 is preferably coaxial with reservoir 12 with its outer surface spaced from the inner surface of reservoir 12, as at 49. Apertures 50 thus communicate with space 49. In the illustrative embodiment, the cylinder 48 is supported at one of its ends by a stub shaft 52 which extends through an opening 54 formed in the forward end of the reservoir 12. Preferably, a bearing 56 is provided rotatably to support the shaft 52 in the opening 54 and an O-ring seal 58 is received in an annular groove 60 adjacent the opening 54 (FIG. 1) to provide a seal which prevents the leakage of fluid from the reservoir 12. The shaft 52 is threaded as indicated at the reference numeral 62 and a nut 64 is placed on the threaded portion of the shaft 52 to abut the end surface 65 of the reservoir 12, thereby to secure the shaft 52 against movement toward the forward end of the reservoir 12. Preferably, a stop nut 66 is also threaded on the shaft 52 as shown in FIGS. 1 and 2.

Figure 7:
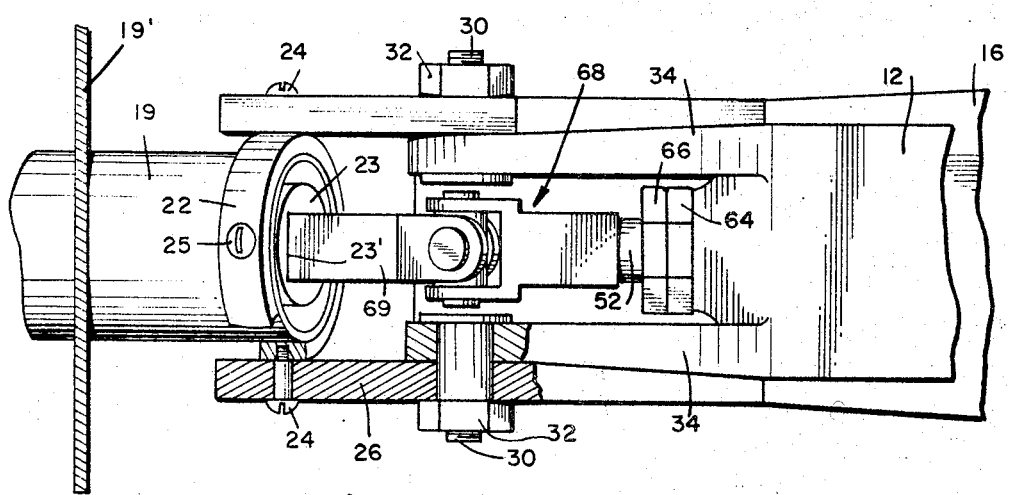
FIG. 7 is a fragmentary elevation view, partly sectioned, taken from the top of FIG. 6.

In order to provide for the above-discussed pivotal movement of the reservoir 12, the shaft 52 is connected to the lower steering shaft 23 of the vehicle through a universal joint indicated generally by the reference numeral 68. Specifically, as shown in FIG. 7, the rear end of the shaft 23 is provided with an axially extending recess 23' which receives the square shaft 69 comprising a portion of the universal joint 68, the recess 23' having a square cross section.

The rear end of the cylinder 48, i.e., the end of the cylinder 48 which is adjacent the fingers 28, is journalled for rotation by means of an end cap 70 which is threaded onto the reservoir 12 as indicated at 72 (FIG. 1) and which is provided with a central opening 74 through which a piston rod 76 extends. Preferably, an annular bearing 78 is mounted in the opening 74 to support the piston rod 76 for axial reciprocation and rotation. Thus, the piston rod 76, which extends through a vertically elongated opening 15 in the instrument panel 14, rotatably supports the forward end of the cylinder 48.

An annular gasket 73 is arranged to provide a seal between the threaded end of the reservoir 12 and the end cap 70 as shown in FIG. 1.

Axially inwardly of the bearing 78 is an end plate 80 having a central opening 82 which receives the piston rod 76 and which is received in an annular cutout 84 formed in the rear end of the cylinder 48 wall. An snap spring 86 which is received in an annular groove 88 in the wall of the cylinder 48 is provided to secure the end plate 80 to the cylinder 48. Between the innermost end of the bearing 78 and the end plate 80 is another O-ring type seal 90 which prevents the leakage of fluid from the rear end of the reservoir 12.

Preferably, the end plate 80 is provided with apertures 92 through which fluid can flow.

A piston 94 is rigidly connected to the piston rod 76 as shown in FIGS. 1 and 2, the piston 94 and piston rod 76 being arranged for axial reciprocation in the cylinder 48. Means are provided, however, for preventing rotation of the piston 94 and piston rod 76 relative to the cylinder 48. In the illustrative embodiment, such means comprises oppositely disposed axially extending keys 96 carried by the piston 94, each key 96 being slidably received in an axially extending keyway 98 formed in the wall of the cylinder 48. In the illustrative embodiment, each of the keys 96 is secured to the piston 94 by means such as the illustrated pin 100.

When the reservoir 12 is completely full of fluid, such as conventional hydraulic fluid, movement of the piston 94 in the cylinder 48 is retarded. That is, when the piston is reciprocated in the cylinder 48, the fluid in the cylinder 48 on one side of the piston 94 in the direction of its movement is forced out through the apertures 50 into the space 49 between the cylinder 48 and walls of the reservoir 12 and then back through other apertures 50 into the cylinder 48 on the other side of the piston 94. Such movement of fluid tends to retard the motion of the piston 94. Of course, the force with which the fluid retards the movement of the piston 94 depends on the number of apertures 50 and their location, the size of the apertures 50 and the viscosity of the fluid. Further, as the piston 94 moves in the direction of the arrow 102, there are progressively fewer apertures 50 ahead of the piston through which the fluid ahead of the piston can flow. Finally, after the piston 94 has moved in the direction of the arrow 102 to close the endmost apertures, indicated by the reference numerals 50', the piston 94 will be stopped by the fluid captured between the piston 94 and the closed end 102 of the cylinder 48. Of course, the movement of the piston 94 in a direction opposite to the arrow 102 is retarded in the same manner by the movement fluid through the apertures 50 and the apertures 92 in the end plate 80.

Preferably, the steering wheel, indicated generally by the reference numeral 104, of the vehicle is connected to the free end of the piston rod 76 by means such as the nut 106 which is threaded onto the rear end of the piston rod 76. Thus, when the piston 94 is positioned anywhere to the right of its position as viewed in FIG. 1, and the driver of the vehicle is hurled against the steering wheel 104, the steering wheel 104 will move in the direction of the arrow 102 and such movement of the steering wheel will be cushioned by the flow of fluid in the reservoir 12 as discussed above. In effect, the reservoir 12, cylinder 48 and piston 94 act as a dashpot to dissipate gradually the energy applied to the steering wheel 104 by the driver's body.

In a preferred embodiment of the present invention, detent means are provided for releasably positioning the piston 94 in any one of a plurality of stop positions along the cylinder 48. In the illustrative embodiment, as viewed in FIG. 1, each of these stop positions is defined by a pair of oppositely disposed openings 108 in the wall of the cylinder 48. The piston 94 is provided with a transaxially extending bore 110 which is registrable with each pair of opposing openings 108. Rollably carried within the bore 110 is a pair of balls 112. A spring 114 is disposed between the balls and arranged to urge them outwardly into engagement with the openings 108, the spring 114 being calibrated so that the balls 112 will releasably engage opposing openings 108, thereby releasably to position the piston 94 in the cylinder 48. The position of the piston 94 is adjusted by pulling or pushing on the piston rod 76 until the balls 112 are engaged with the desired pair of openings 108. Of course, the shock of a human body hurled against the steering wheel 104 by a "head-on collision" will be sufficient to disengage the balls 112 to permit movement of the piston 94 to absorb gradually the energy with which the body is hurled against the steering wheel 104.

It will be apparent, therefore, from the above description, that the steering wheel 104 is adjustably movable vertically and inwardly and outwardly relative to the dashboard and instrument panel 14. Specifically, an operator of the vehicle in which the steering apparatus of the present invention is installed can manually adjust the vertical position of the steering wheel 104 by raising and lowering the rear end of the reservoir 12 to each of the positions defined by the cutouts 38 and can position the steering wheel 104 inwardly and outwardly by manually moving the piston 94 to each of the positions defined by the openings 108.

Figure 4:
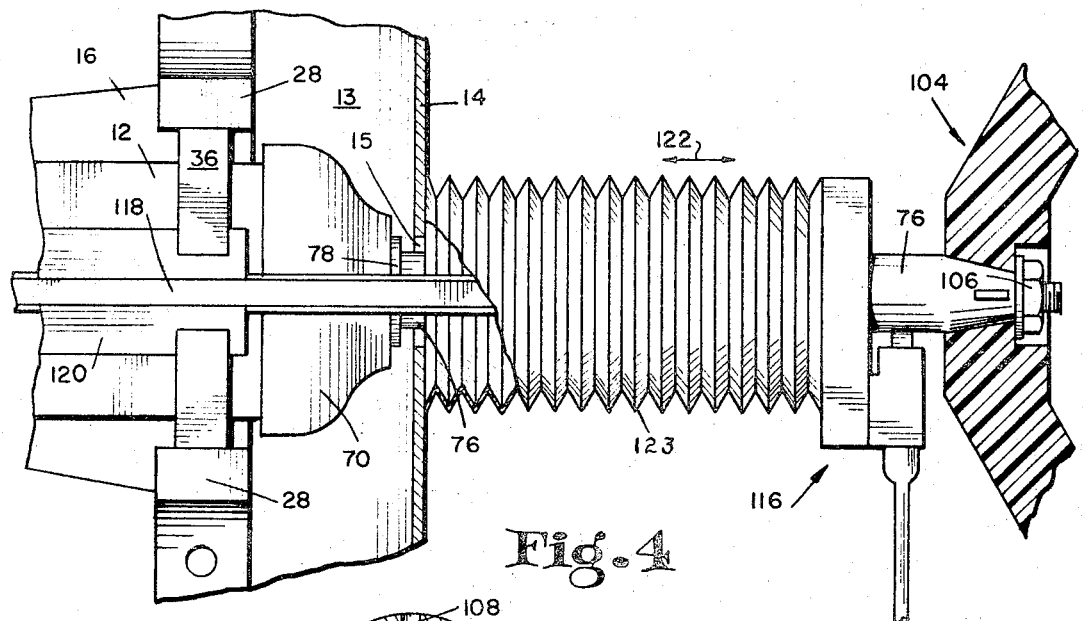
FIG. 4 is a fragmentary, partially sectioned view showing the manner in which a turn-signal mechanism is mounted on the rear end of the collapsible steering column of this invention.
Figure 5:
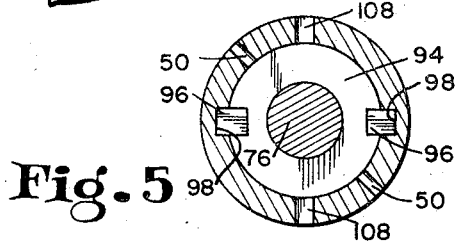
FIG. 5 is a sectional view, slightly reduced, taken from FIG. 1 generally along the line 5—5.

Since the piston rod 76 is movable inwardly and outwardly to adjust the position of the steering wheel 104, the conventional turn-signal mechanism 16 which is mounted inwardly of the steering wheel 104, as suggested in FIG. 4, is provided with an elongated member 118 which extends generally parallel to the piston rod 76 and which is slidably engaged by a member 120 rigidly connected to the reservoir 12. Preferably, as seen in FIG. 3, the member 120 forms a dovetail groove 121 and the member 118 is in the form of a dovetail tenon slidably engaged in the groove 121. The member 118 permits the turn-signal mehcanism 116 to be reciprocated with the piston rod 76 as suggested by the arrow 122, but prevents rotation of the turn-signal mechanism when the piston rod 76 is rotated. The turn-signal mechanism 116 is conventional and, therefore, does not need to be discussed in this description.

Preferably, there is an accordion-pleated sleeve 123 disposed about the piston rod 76 and the member 118 as shsown in FIG. 4. Of course, the sleeve 123 is compressible to permit inward movement of the steering wheel.

Since the steering wheel 104 is adjustable vertically by overcoming the holding power of the spring-loaded balls 42, when the operator of the vehicle is hurled against the 42, the steering wheel 104, the steering wheel will move vertically to conform to the operator's body, thereby to prevent injury of the operator by contact with the top or the bottom of the steering wheel.

It will be apparent that, although the steering wheel 104 is adjustably movable inwardly and outwardly and vertically, the keys 96 received in the axially-elongated keyways 98 prevent rotation of the steering wheel 104 relative to the shaft 23. Thus, the operator has complete control of the vehicle in all axial positions of the piston 94.

Figure 6:
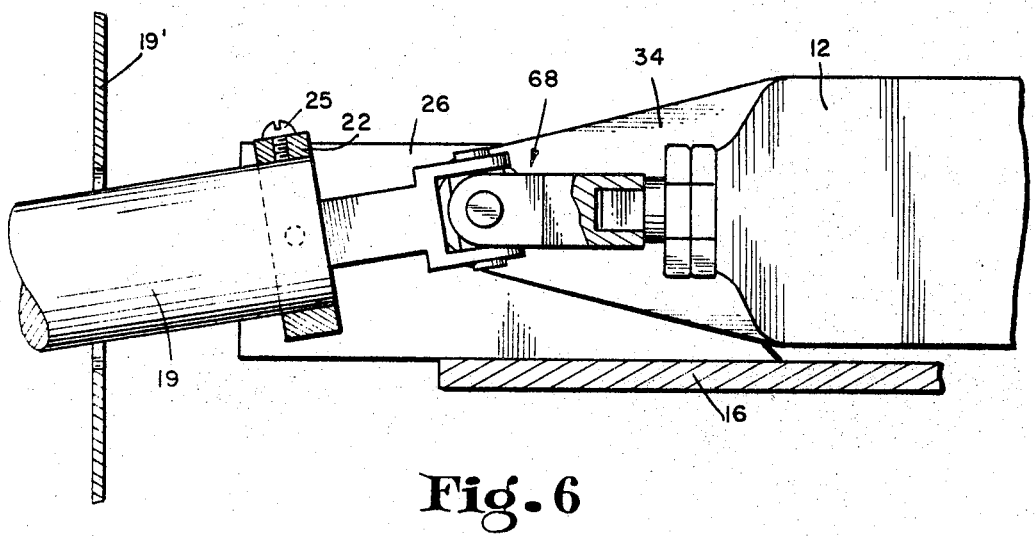
FIG. 6 is a fragmentary sectional view showing means supporting the forward end of the fluid reservoir.

The apparatus 10 can be readily installed in automobiles having different spacings between the firewall and the dashboard (instrument panel 14). Specifically, the steering shaft 23 and sleeve 19 are cut off at the proper length rearwardly of the firewall 19' for attachment to the universal joint 68 and the collar 22 respectively. (FIGS. 6 and 7.) The collar 22 is secured to the sleeve 19 by means such as the set screw 25.

In a small automobile, i.e., an automobile with a relative small space between the firewall 19' and dashboard, only a small amount (about 2 inches) of the sleeve 19 will protrude rearwardly of the firewall 19', while in a larger automobile, a relative large amount (greater than 6 inches) will protrude rearwardly of the firewall 19'.

The illustrated arrangement for mounting the forward end of the bracket 16 on the rearward end of the sleeve 19 prevents vibration of the steering column.

While there have been discussed above the principles of this invention in conjunction with the specific apparatus, it is to be clearly understood that this description is made by way of example and not as a limitation to the scope of the invention.

What is claimed is:

1. A fluid cushioned steering apparatus comprising a reservoir, means for mounting said reservoir in an automotive vehicle, a cylinder having a plurality of longitudinally spaced apertures formed therein and journalled for rotation in said reservoir, said cylinder having first and second ends a piston and its connecting piston rod arranged for reciprocation in said cylinder, means for preventing rotation of said piston and piston rod relative to said cylinder, said piston and said cylinder being arranged so that, when said piston is reciprocated in said cylinder, the fluid in said cylinder on one side of said piston is forced out through said apertures into said reservoir and back into said cylinder on the other side of said piston, such movement of fluid thereby retarding the movement of said piston, said piston rod extending through said first end of said cylinder and said reservoir to constitute a portion of the steering column for said vehicle, and means connected to the second end of said cylinder to constitute another portion of the steering column of said vehicle.

2. An apparatus as in claim 1 wherein said means for mounting said reservoir comprises bracket means adapted to be mounted under the dashboard of said vehicle, said bracket means including, near the front of the dashboard, first support means and, behind the front of said dashboard and toward the firewall of the vehicle, second support means, means for connecting the forward end of said reservoir to said second support means for pivotal movement about a generally horizontal axis, and selectively vertically adjustable means for connecting the rear end of said reservoir to said first support means.

3. An apparatus as in claim 2 wherein said first support means includes a pair of laterally spaced, generally vertically extending fingers operatively receiving therebetween the rear end of said reservoir, wherein the vertical adjusting means has a plurality of generally vertically spaced, generally concave openings formed therein and opening toward the inside surface of at least one of said fingers, and a member arranged releasably to engage a selected one of said openings and a spring for urging said member toward said openings.

4. An apparatus as in claim 3 wherein the free end of said piston rod is adapted to have the steering wheel of said vehicle mounted thereon and wherein said means connected to the second end of said cylinder includes means for connection to the steering linkage for said vehicle.

5. An apparatus as in claim 3 wherein said member is a ball rollably carried in a generally horizontally extending opening in said one of said fingers, said spring being received in said opening.

6. An apparatus as in claim 4 further comprising a turn-signal mechanism operatively mounted on said piston rod for reciprocation therewith, said mechanism including a member rigidly attached thereto and extending generally parallel to said piston rod, and means slidably engaging said member to restrain said mechanism against rotation with said piston rod.

7. An apparatus as in claim 1 wherein said means preventing rotation of said piston relative to said cylinder comprises a key carried by said piston, and said cylinder being formed with a longitudinally extending keyway slidably receiving said key.

8. An apparatus as in claim 1 further comprising means for selectively and adjustably positioning said piston in said cylinder, thereby selectively to position the steering wheel of said vehicle, said positioning means comprising detent means arranged releasably to hold said piston in any one of a plurality of stop positions arranged longitudinally along said cylinder.

9. An apparatus as in claim 8 wherein said stop positions are defined by longitudinally spaced openings formed in the wall of said cylinder and wherein said detent means comprises a member arranged releasably to engage each of said openings, said member being carried by said piston, and spring means for urging said member into engagement with said openings.

10. An apparatus as in claim 8 wherein said means for mounting said reservoir comprises bracket means adapted to be mounted under the dashboard of said vehicle, and means for releasably connecting said reservoir to said bracket means in selected vertical positions thereon, thereby vertically to position the steering wheel of said vehicle.

11. An apparatus as in claim 10 wherein said releasable connecting means for said reservoir is provided with a plurality of generally vertically spaced cutouts formed therein and a member carried by said bracket means and arranged releasably to engage said cutouts and spring means for urging said member into engagement with said cutouts.

12. An apparatus as in claim 6 further comprising an accordion-pleated sleeve peripherally surrounding said piston rod and said last named member, said sleeve being compressible when said piston rod is moved axially inwardly.

References Cited

UNITED STATES PATENTS

| | | | |
|---|---|---|---|
| 2,549,345 | 4/1951 | Tamboli | 74—493 |
| 2,639,626 | 5/1953 | Snyder | 74—493 |
| 2,852,956 | 9/1958 | May | 74—493 |
| 3,389,617 | 6/1968 | Pavlecka | 74—492 |

MILTON KAUFMAN, *Primary Examiner.*

U.S. Cl. X.R.

180—78; 280—87; 188—97